(12) United States Patent
Ranjit et al.

(10) Patent No.: US 11,050,640 B1
(45) Date of Patent: Jun. 29, 2021

(54) NETWORK THROUGHPUT ASSURANCE, ANOMALY DETECTION AND MITIGATION IN SERVICE CHAIN

(71) Applicant: Cisco Technology, Inc., San Jose, CA (US)

(72) Inventors: Dinesh Ranjit, San Jose, CA (US); Pradeep Kanavihalli Subramanyasetty, San Jose, CA (US); Shiva Prasad Rao, San Jose, CA (US); Dhanashree Somnath Gosavi, San Jose, CA (US); Colt Ashton Campbell, San Jose, CA (US); Prafulla Harpanhalli, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/713,569

(22) Filed: Dec. 13, 2019

(51) Int. Cl.
   *G06F 15/16* (2006.01)
   *H04L 12/24* (2006.01)
   *H04L 12/26* (2006.01)
   *G06F 9/455* (2018.01)

(52) U.S. Cl.
   CPC ...... *H04L 41/5025* (2013.01); *G06F 9/45558* (2013.01); *H04L 41/142* (2013.01); *H04L 43/062* (2013.01); *H04L 43/0888* (2013.01); *G06F 2009/45591* (2013.01); *G06F 2009/45595* (2013.01)

(58) Field of Classification Search
   CPC . H04L 41/5025; H04L 41/142; H04L 43/062; H04L 43/0888; G06F 9/45558; G06F 2009/45591; G06F 2009/45595
   See application file for complete search history.

(56) References Cited

U.S. PATENT DOCUMENTS

| | | | | |
|---|---|---|---|---|
| 9,929,945 | B2* | 3/2018 | Schultz | H04L 45/025 |
| 2014/0344439 | A1* | 11/2014 | Kempf | G06F 9/5072 |
| | | | | 709/224 |
| 2015/0365324 | A1* | 12/2015 | Kumar | H04L 12/4641 |
| | | | | 370/392 |
| 2016/0149784 | A1* | 5/2016 | Zhang | H04B 17/00 |
| | | | | 370/229 |
| 2017/0250892 | A1* | 8/2017 | Cooper | G06F 21/552 |

(Continued)

OTHER PUBLICATIONS

International Search Report and Written Opinion from the International Searching Authority, dated Feb. 26, 2021, 14 pages, for corresponding International Patent Application No. PCT/US2020/062587.

(Continued)

*Primary Examiner* — Hieu T Hoang
(74) *Attorney, Agent, or Firm* — Polsinelli PC

(57) ABSTRACT

Systems, methods, and computer-readable media for providing throughput assurance in a virtual service chain. A virtual service chain formed by a plurality of stitched virtualized network functions running on a plurality of virtual nodes can be monitored. An inline statistics agent can generate inline statistics of the operation of the virtual service chain. Further, an actual throughput of the virtual service chain can be identified from the inline statistics. As follows, throughput assurance for the virtual service chain can be provided by comparing the actual throughput of the virtual service chain with an expected throughput of the virtual service chain.

20 Claims, 8 Drawing Sheets

(56) References Cited

U.S. PATENT DOCUMENTS

| | | | | |
|---|---|---|---|---|
| 2017/0310611 | A1* | 10/2017 | Kumar | H04L 67/2842 |
| 2017/0371692 | A1* | 12/2017 | Connolly | G06F 9/45558 |
| 2018/0063018 | A1* | 3/2018 | Bosch | H04L 45/306 |
| 2018/0083847 | A1* | 3/2018 | Chiba | H04L 69/22 |
| 2018/0091395 | A1* | 3/2018 | Shinohara | G06F 9/45558 |
| 2018/0225139 | A1* | 8/2018 | Hahn | H04L 12/4625 |
| 2019/0104022 | A1* | 4/2019 | Power | H04L 41/0896 |
| 2019/0124096 | A1 | 4/2019 | Ahuja et al. | |

OTHER PUBLICATIONS

Alvarez, Federico, et al., "An Edge-to-Cloud Virtualized Multimedia Service Platform for 5G Networks," IEEE Transactions on Broadcasting, vol. 65, No. 2, Jun. 2019, pp. 369-380.

Acar, Ugur, et al., "Programming Tools for Rapid NFV-Based Media Application Development in 5G Networks," 2018 IEEE Conference on Network Function Virtualization and Software Defined Networks (NFV-SDN); 5GNetApp-5G-ready Network Applications, Services Development and Orchestration over Application-aware Nerwork Slices © IEEE NFV-SDN 2018, Nov. 27, 2018, 5 pages.

Romero, Alexis, et al., "Performance and Fault Monitoring of Osm Modules in Kubernetes," Open Source Mano, Sep. 13, 2019, 6 pages.

* cited by examiner

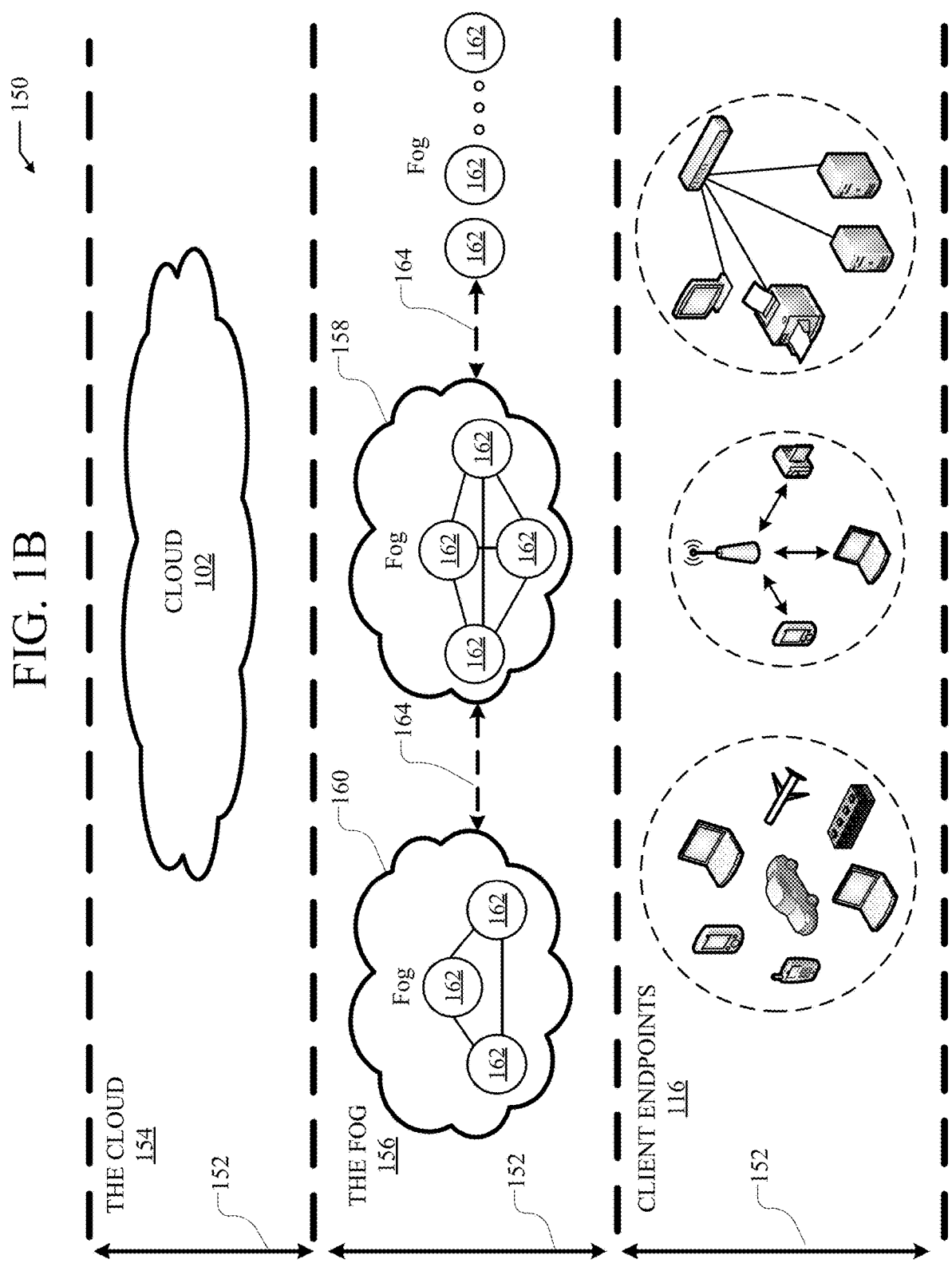

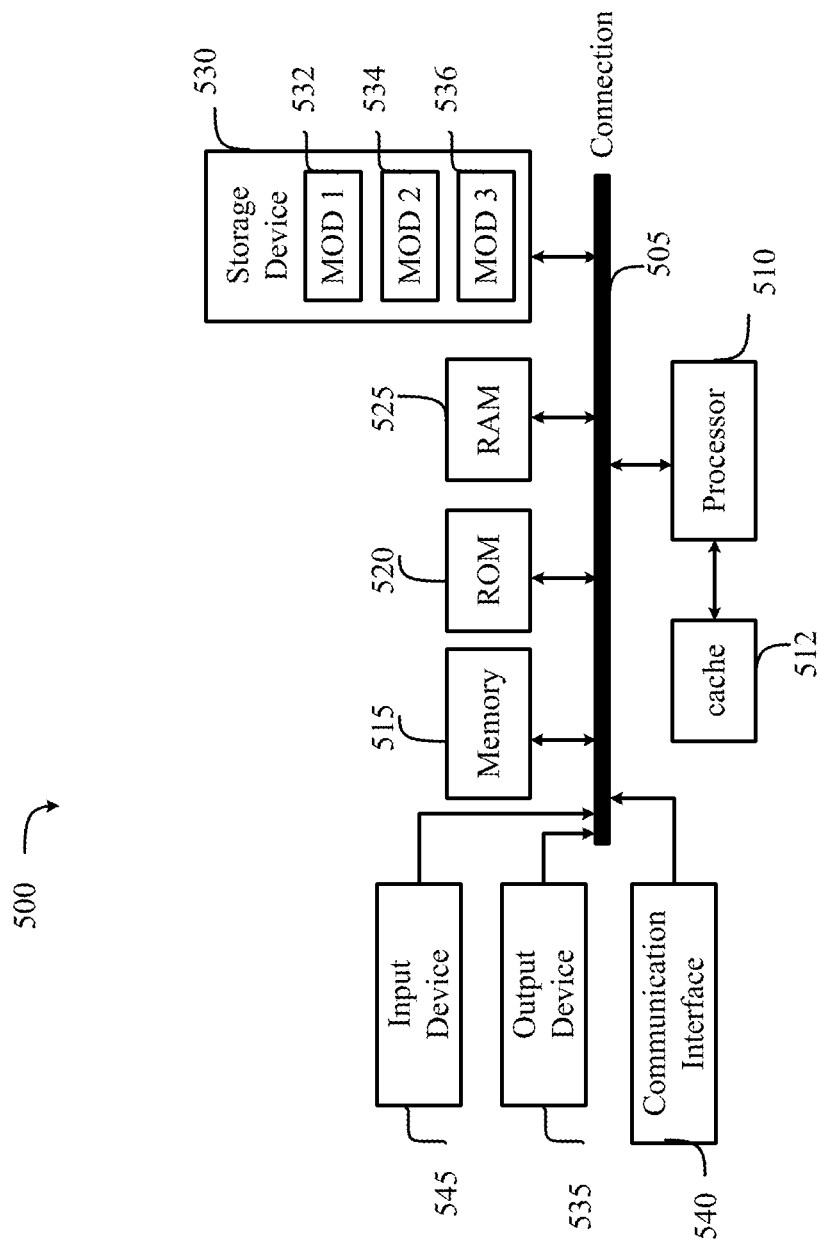

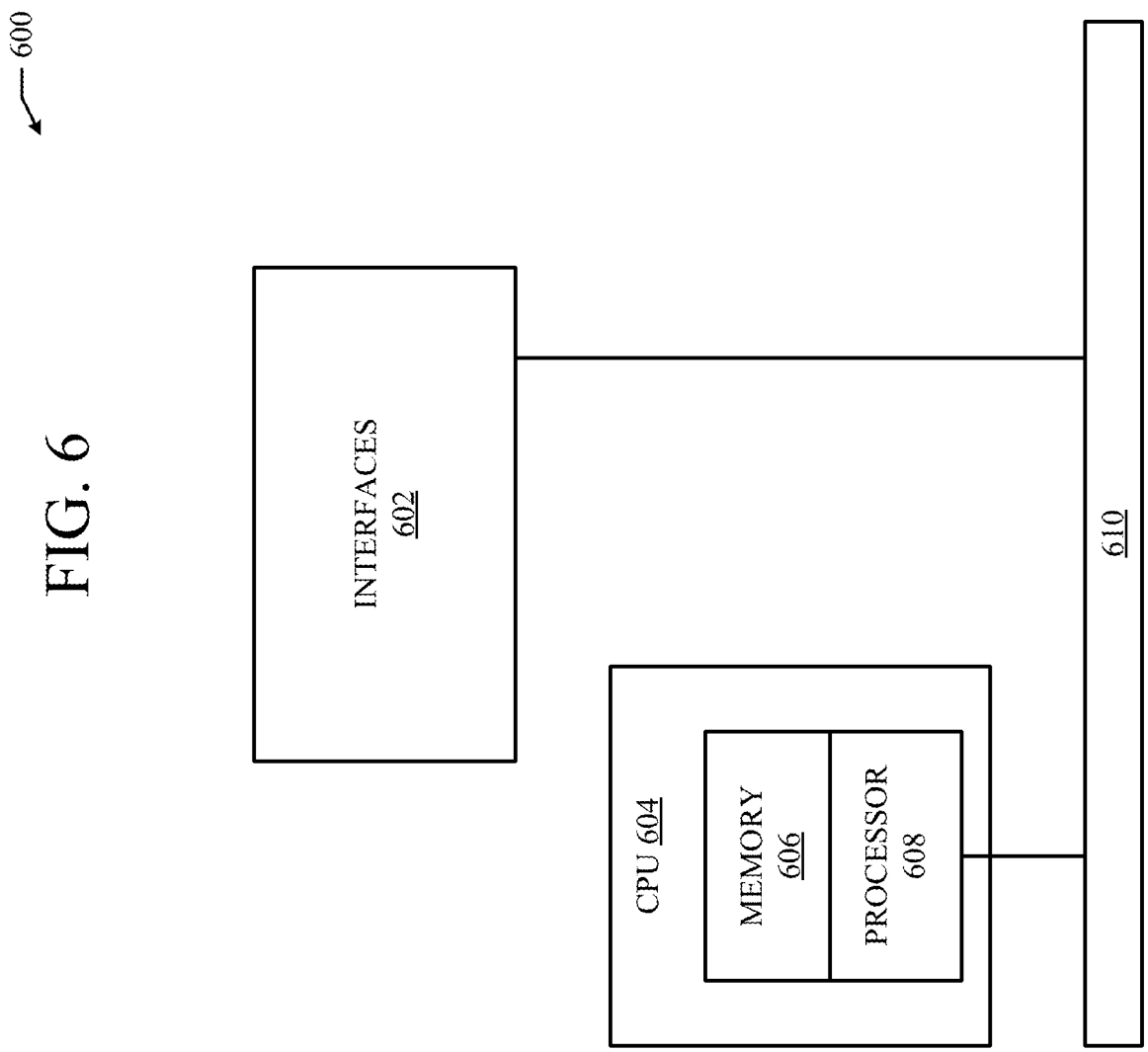

NETWORK THROUGHPUT ASSURANCE, ANOMALY DETECTION AND MITIGATION IN SERVICE CHAIN

TECHNICAL FIELD

The present technology pertains in general to network virtualization and in particular to providing throughput assurance for a service chain of virtualized network functions.

BACKGROUND

Network virtualization abstracts networking connectivity and services that have traditionally been delivered via hardware into a logical virtual network that runs on top of a physical network in a hypervisor. Network virtualization can be implemented through virtual network functions (VNFs) running on virtual machines (VMs). These VNFs can handle or otherwise perform specific network functions like firewall functions or load balancing functions. Within network virtualization, multiple VNFs on one or more hypervisor platforms can be stitched together to create virtualized service chains in a network environment. For example, a service chain can be used to implement various network functions in connecting consumers to one or more cloud service providers (e.g. Amazon Web Services®, Microsoft Azure®, etc.). A typical service chain may consist of a router, a load balancer, and a firewall in a virtual form factor. In operation, network traffic can pass through the various VNF branches of a virtual service chain between a cloud service provider and a client.

Users typically expect a specific throughput for a service chain. Specifically, users expect that the service chain is configured correctly on the hypervisor platform and that a specific throughput is achievable through the individual VNFs, and the corresponding service chain as a whole. Typically, an infrastructure provider/service provider for the service chain is responsible for assuring an expected throughput for the chain. However, it is currently difficult for service providers to diagnose and resolve issues in service chains due to a lack of visibility in virtual networks. In particular, as multiple VNFs are used in a virtual service chain and as a result of poor visibility in virtual networks, it is difficult for service providers to identify which link or VNF is behaving as an anomaly in the service chain, e.g. as part of providing throughput assurance for the service chain to a customer.

BRIEF DESCRIPTION OF THE DRAWINGS

FIG. 1B illustrates an example fog computing architecture;

FIG. 5 illustrates an example computing system; and

FIG. 6 illustrates an example network device.

DETAILED DESCRIPTION

Figure 1A:
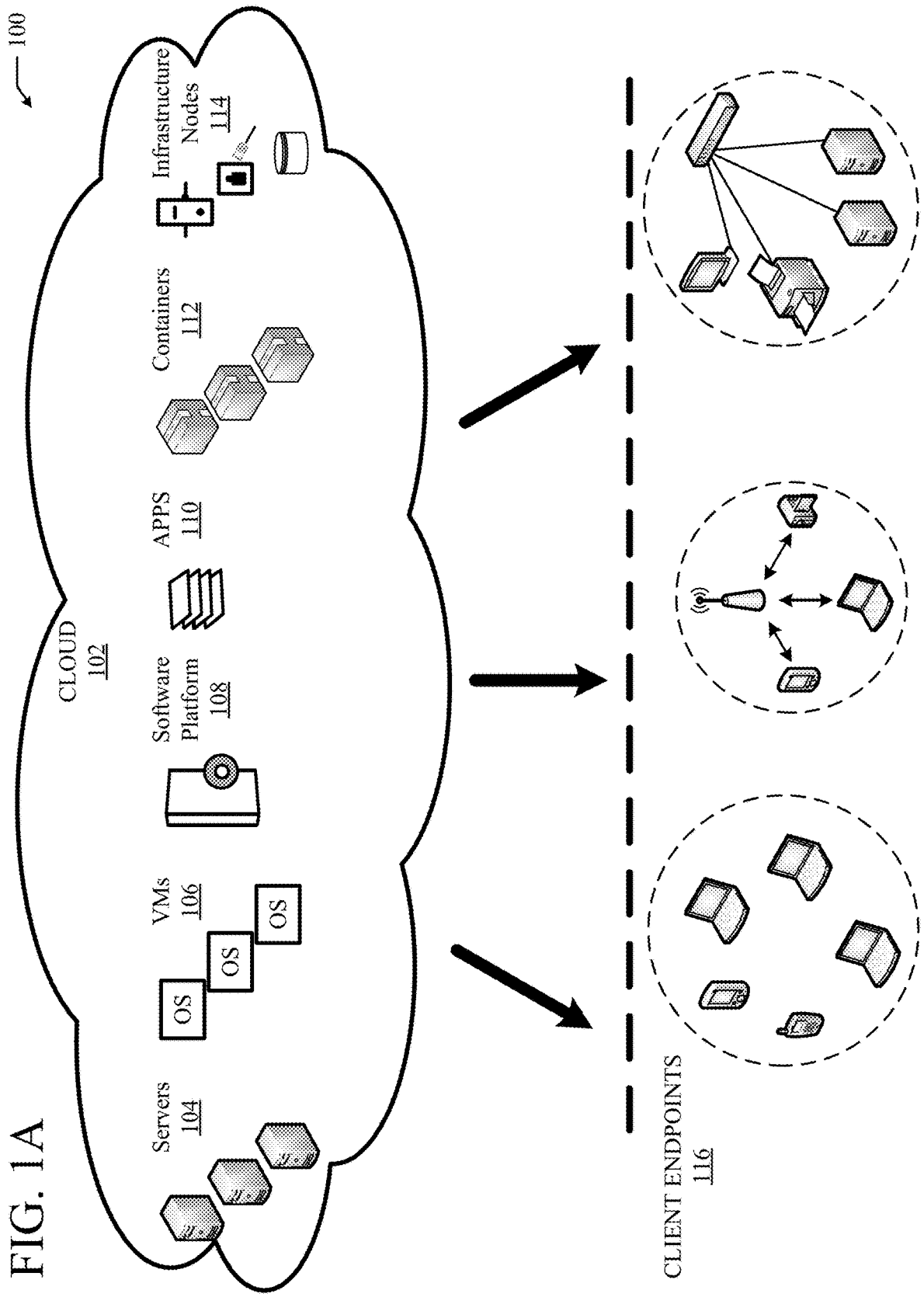
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description.

As used herein, "one embodiment" or "an embodiment" can refer to the same embodiment or any embodiment(s). Moreover, reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Features described herein with reference to one embodiment can be combined with features described with reference to any embodiment.

The terms used in this specification generally have their ordinary meanings in the art, within the context of the disclosure and the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification, including examples of any terms discussed herein, is illustrative and not intended to limit the scope and meaning of the disclosure or any example term. Likewise, the disclosure is not limited to the specific embodiments or examples described in this disclosure.

Without intent to limit the scope of the disclosure, examples of instruments, apparatus, methods and their related functionalities are provided below. Titles or subtitles may be used in the examples for convenience of a reader, and in no way should limit the scope of the disclosure. Unless otherwise defined, technical and scientific terms used herein have the meaning as commonly understood by one of ordinary skill in the art to which this disclosure pertains. In the case of a conflict, the present document and included definitions will control.

Additional features and advantages of the disclosure will be set forth in the description which follows, and in part will be recognized from the description, or can be learned by practice of the herein disclosed principles. The features and advantages of the disclosure can be realized and obtained by means of the instruments and combinations particularly pointed out herein. These and other features of the disclosure will become more fully apparent from the following description and appended claims, or can be learned by the practice of the principles set forth herein.

Overview

Disclosed herein are systems, methods and computer-readable storage media for monitoring virtualized network functions in a virtual service chain.

A method can include monitoring a virtual service chain formed by a plurality of stitched virtualized network functions running on a plurality of virtual nodes. An inline statistics agent can generate inline statistics of the operation of the virtual service chain. Further, an actual throughput of the virtual service chain can be identified from the inline statistics. As follows, throughput assurance for the virtual service chain can be provided by comparing the actual throughput of the virtual service chain with an expected throughput of the virtual service chain.

The inline statistic agent can be implemented in a hypervisor layer under the plurality of virtual nodes. Further, the virtualized network functions can be stitched together at least in part, through the hypervisor layer. Accordingly, data passing between the virtualized network functions can be monitored by the inline statistics agent in the hypervisor layer to generate the inline statistics for the virtual service chain.

Data passing between the virtualized network functions can be analyzed on a per-virtual node basis of the plurality of virtual nodes to generate inline statistics for each of the virtualized network functions in the virtual service chain as part of generating the inline statistics for the virtual service chain. The inline statistics for each of the virtualized network functions can be generated by comparing ingress data throughput at each of the virtualized network functions to corresponding egress data throughput at each of the virtualized network functions.

The inline statistics for each of the virtualized network functions can be compared with the inline statistics of one or more adjacent virtualized network functions in the virtual service chain. As follows, the throughput assurance for the virtual service chain can be provided based on comparisons of the inline statistics of each of the virtualized functions with the inline statistics of the one or more adjacent virtualized network functions in the virtual service chain. Adjacent virtualized network functions can share a virtual link point in the virtual service chain to allow the data to pass directly between the adjacent virtualized network functions as the data passes through the virtual service chain.

Corresponding egress data throughput at each of the virtualized network functions, as included as part of the inline statistics for each of the virtualized network functions, can be compared with the expected throughput of the virtual service chain. As follows, the throughput assurance for the virtual service chain can be provided based on comparisons of the corresponding egress data throughput at each of the virtualized network functions with the expected throughput of the virtual service chain. Further, a virtualized network function in the virtual service chain can be recognized as behaving as an anomaly in the virtual service chain based on a comparison with an egress data throughput at the virtualized network function with the expected throughput of the virtual service chain. As follows, the virtualized network function can be reported as the anomaly as part of providing the throughput assurance for the virtual service chain. The virtualized network function can be identified as the anomaly in response to the egress data throughput at the virtualized network function being below the expected throughput of the virtual service chain.

Throughput of a first virtualized network function of the virtual service chain can be compared to the expected throughput for the virtual service chain. In turn, the throughput assurance for the virtual service chain can be provided based on a comparison of the entering throughput to the expected throughput of the virtual service chain. Specifically, if the entering throughput is less than the expected throughput, then the data passing between the virtualized network functions can be analyzed on a per-virtual node basis to provide the throughput assurance for the virtual service chain.

The virtual service chain can be formed between a customer and a provider. Further, the throughput assurance for the virtual service chain is provided in either or both a direction from the consumer to the provider and from the provider to the consumer. Additionally, an infrastructure provider of the plurality of virtual nodes can be different from a network service provider of the virtual service chain.

A system can include one or more processors and at least one computer-readable storage medium storing instructions which, when executed by the one or more processors, cause the one or more processors to monitor a virtual service chain formed by a plurality of stitched virtualized network functions running on a plurality of virtual nodes. The instructions can also cause the one or more processors to generate, by an inline statistics agent, inline statistics of the operation of the virtual service chain. The inline statistics agent can be implemented in a hypervisor layer under the plurality of virtual nodes. Further, the instructions can cause the one or more processors to identify an actual throughput of the virtual service chain from the inline statistics. Additionally, the instructions can cause the one or more processors to provide throughput assurance for the virtual service chain by comparing the actual throughput of the virtual service chain with an expected throughput of the virtual service chain.

A non-transitory computer-readable storage medium having stored therein instructions which, when executed by a processor, cause the processor to monitor a virtual service chain formed by a plurality of stitched virtualized network functions running on a plurality of virtual nodes. The instructions can also cause the processor to generate, by an inline statistics agent, inline statistics of the operation of the virtual service chain. The virtualized network functions can be stitched together, at least in part, through a hypervisor layer and the data passing between the virtualized network functions can be monitored by the inline statistics agent in the hypervisor layer to generate the inline statistics for the virtual service chain. Further, the instructions can cause the processor to identify an actual throughput of the virtual service chain from the inline statistics. Additionally, the instructions can cause the processor to provide throughput assurance for the virtual service chain by comparing the actual throughput of the virtual service chain with an expected throughput of the virtual service chain.

The foregoing, together with other features and embodiments, will become more apparent upon referring to the following specification, claims, and accompanying drawings.

DESCRIPTION OF EXAMPLE EMBODIMENTS

The disclosed technology addresses the need in the art for providing throughput assurance in virtualized network service chains. In particular, the disclosed technology address the need in the art for monitoring virtualized network functions on a per-network function basis to effectively detect and mitigate an impact of anomalies in a service chain. The present technology involves systems, methods, and computer-readable media for providing throughput assurance, anomaly detection and anomaly mitigation in a virtualized network service chain. In particular, the present technology involves systems, methods, and computer-readable media for providing throughput assurance, anomaly detection, and anomaly mitigation in a virtualized network service chain on a per-network function basis.

Figure 3:
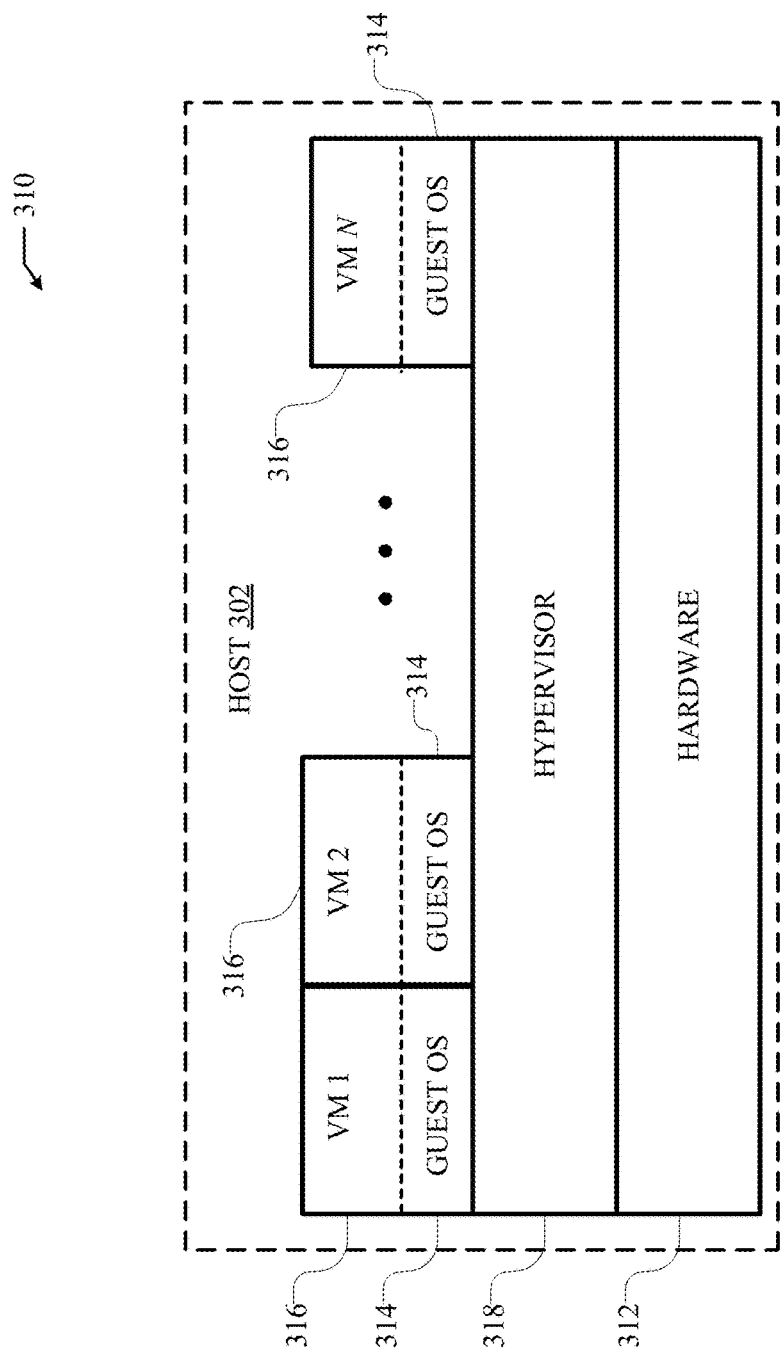
FIG. 3 illustrates a schematic diagram of an example virtual machine (VM) deployment.
Figure 4:
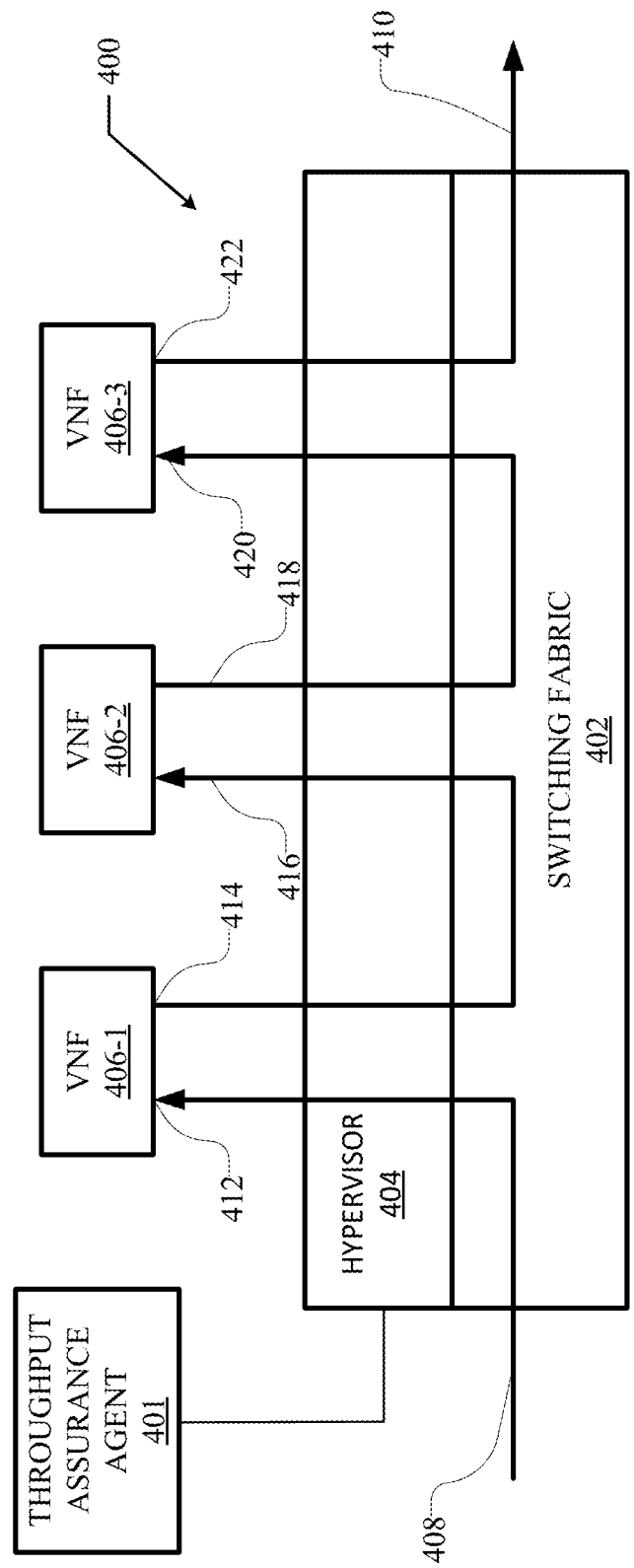
FIG. 4 illustrates an example virtualized network environment with a network throughput assurance agent, in accordance with various aspects of the subject technology.

A description of network environments and architectures for network data access and services, as illustrated in FIGS. 1A, 1B, 2A, 2B is first disclosed herein. A discussion of systems, methods, and computer-readable media for implementing virtual machine network deployments and providing throughput assurance for virtualized network service chains in the deployments, as shown in FIGS. 3-4, will then follow. The discussion then concludes with a brief description of example devices, as illustrated in FIGS. 5 and 6. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographical locations, logical locations or networks, and/or fog instances while maintaining connectivity with the cloud layer 154 and/or the endpoints 116. For example, a particular fog node can be placed in a vehicle, such as an aircraft or train, which can travel from one geographical location and/or logical location to a different geographical location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2A:
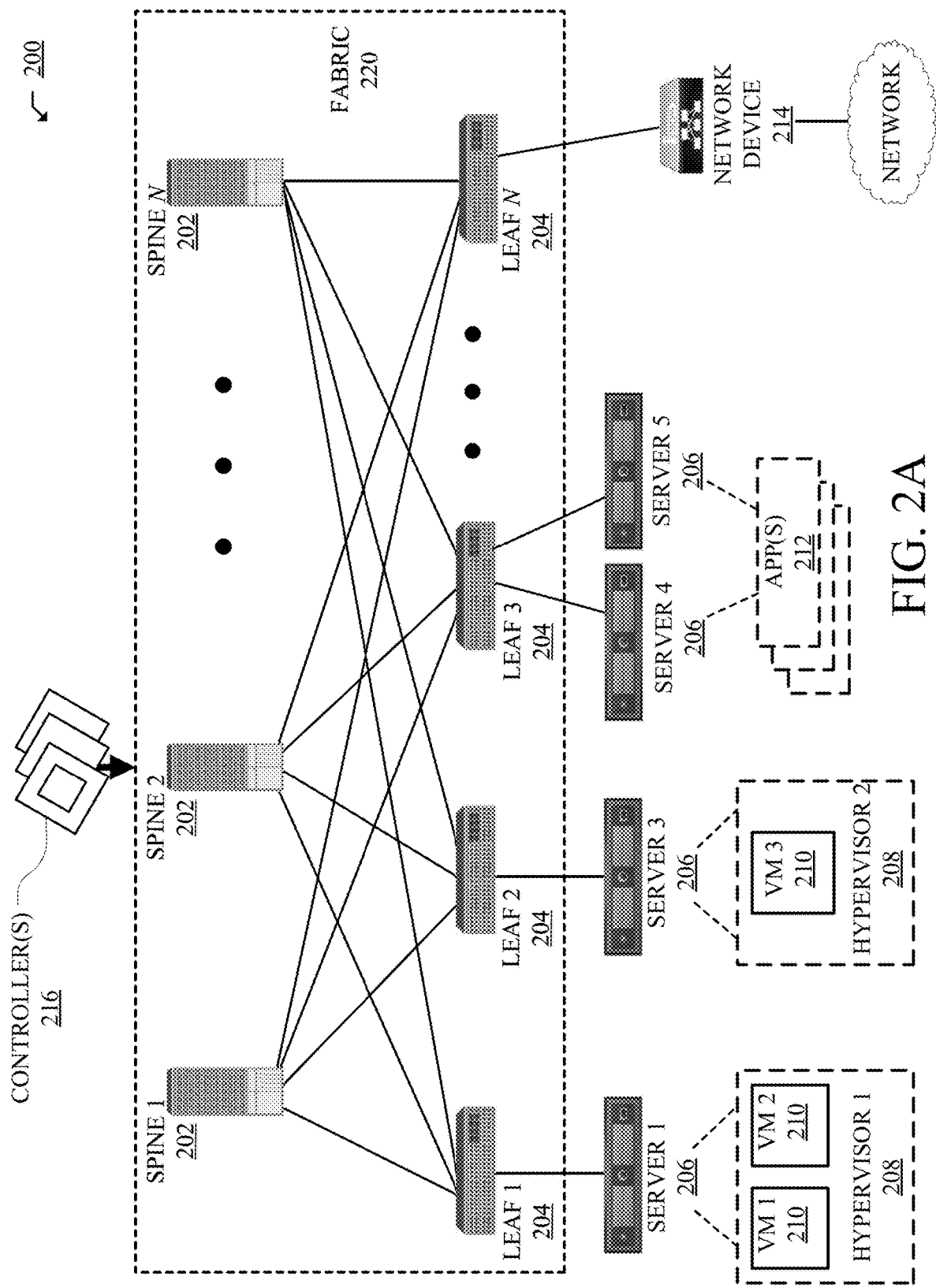
FIG. 2A illustrates a diagram of an example network environment, such as a data center.

FIG. 2A illustrates a diagram of an example Network Environment 200, such as a data center. In some cases, the Network Environment 200 can include a data center, which can support and/or host the cloud 102. The Network Environment 200 can include a Fabric 220 which can represent the physical layer or infrastructure (e.g., underlay) of the Network Environment 200. Fabric 220 can include Spines 202 (e.g., spine routers or switches) and Leafs 204 (e.g., leaf routers or switches) which can be interconnected for routing or switching traffic in the Fabric 220. Spines 202 can interconnect Leafs 204 in the Fabric 220, and Leafs 204 can connect the Fabric 220 to an overlay or logical portion of the Network Environment 200, which can include application services, servers, virtual machines, containers, endpoints, etc. Thus, network connectivity in the Fabric 220 can flow from Spines 202 to Leafs 204, and vice versa. The interconnections between Leafs 204 and Spines 202 can be redundant (e.g., multiple interconnections) to avoid a failure in routing. In some embodiments, Leafs 204 and Spines 202 can be fully connected, such that any given Leaf is connected to each of the Spines 202, and any given Spine is connected to each of the Leafs 204. Leafs 204 can be, for example, top-of-rack ("ToR") switches, aggregation switches, gateways, ingress and/or egress switches, provider edge devices, and/or any other type of routing or switching device.

Leafs 204 can be responsible for routing and/or bridging tenant or customer packets and applying network policies or rules. Network policies and rules can be driven by one or more Controllers 216, and/or implemented or enforced by one or more devices, such as Leafs 204. Leafs 204 can connect other elements to the Fabric 220. For example, Leafs 204 can connect Servers 206, Hypervisors 208, Virtual Machines (VMs) 210, Applications 212, Network Device 214, etc., with Fabric 220. Such elements can reside in one or more logical or virtual layers or networks, such as an overlay network. In some cases, Leafs 204 can encapsulate and decapsulate packets to and from such elements (e.g., Servers 206) in order to enable communications throughout Network Environment 200 and Fabric 220. Leafs 204 can also provide any other devices, services, tenants, or workloads with access to Fabric 220. In some cases, Servers 206 connected to Leafs 204 can similarly encapsulate and decapsulate packets to and from Leafs 204. For example, Servers 206 can include one or more virtual switches or routers or tunnel endpoints for tunneling packets between an overlay or logical layer hosted by, or connected to, Servers 206 and an underlay layer represented by Fabric 220 and accessed via Leafs 204.

Applications 212 can include software applications, services, containers, appliances, functions, service chains, etc. For example, Applications 212 can include a firewall, a database, a CDN server, an IDS/IPS, a deep packet inspection service, a message router, a virtual switch, etc. An application from Applications 212 can be distributed, chained, or hosted by multiple endpoints (e.g., Servers 206, VMs 210, etc.), or may run or execute entirely from a single endpoint.

VMs 210 can be virtual machines hosted by Hypervisors 208 or virtual machine managers running on Servers 206. VMs 210 can include workloads running on a guest operating system on a respective server. Hypervisors 208 can provide a layer of software, firmware, and/or hardware that creates, manages, and/or runs the VMs 210. Hypervisors 208 can allow VMs 210 to share hardware resources on Servers 206, and the hardware resources on Servers 206 to appear as multiple, separate hardware platforms. Moreover, Hypervisors 208 on Servers 206 can host one or more VMs 210.

In some cases, VMs 210 can be migrated to other Servers 206. Servers 206 can similarly be migrated to other physical locations in Network Environment 200. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 206, Hypervisors 208, and/or VMs 210 can represent or reside in a tenant or customer space. Tenant space can include workloads, services, applications, devices, networks, and/or resources that are associated with one or more clients or subscribers. Accordingly, traffic in Network Environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 216, Servers 206, Leafs 204, etc.

Configurations in Network Environment 200 can be implemented at a logical level, a hardware level (e.g., physical), and/or both. For example, configurations can be implemented at a logical and/or hardware level based on endpoint or resource attributes, such as endpoint types and/or application groups or profiles, through a software-defined networking (SDN) framework (e.g., Application-Centric Infrastructure (ACI) or VMWARE NSX). To illustrate, one or more administrators can define configurations at a logical level (e.g., application or software level) through Controllers 216, which can implement or propagate such configurations through Network Environment 200. In some examples, Controllers 216 can be Application Policy Infrastructure Controllers (APICs) in an ACI framework. In other examples, Controllers 216 can be one or more management components for associated with other SDN solutions, such as NSX Managers.

Such configurations can define rules, policies, priorities, protocols, attributes, objects, etc., for routing and/or classifying traffic in Network Environment 200. For example, such configurations can define attributes and objects for classifying and processing traffic based on Endpoint Groups, Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 200, such as Leafs 204, Servers 206, Hypervisors 208, Controllers 216, etc. As previously explained, Network Environment 200 can be configured according to one or more particular SDN solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 200. Endpoints can have one or more attributes such as a VM name, guest OS name, a security tag, application profile, etc. Application configurations can be applied between EPGs, instead of endpoints directly, in the form of contracts. Leafs 204 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by ACI virtual edge (AVE), which can run on a host, such as a server, e.g. a vSwitch running on a server. For example, the AVE can classify traffic based on specified attributes, and tag packets of different attribute EPGs with different identifiers, such as network segment identifiers (e.g., VLAN ID). Finally, Leafs 204 can tie packets with their attribute EPGs based on their identifiers and enforce policies, which can be implemented and/or managed by one or more Controllers 216. Leaf 204 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 2A, Network Environment 200 can deploy different hosts via Leafs 204, Servers 206, Hypervisors 208, VMs 210, Applications 212, and Controllers 216, such as VMWARE ESXi hosts, WINDOWS HYPER-V hosts, bare metal physical hosts, etc. Network Environment 200 may interoperate with a variety of Hypervisors 208, Servers 206 (e.g., physical and/or virtual servers), SDN orchestration platforms, etc. Network Environment 200 may implement a declarative model to allow its integration with application design and holistic network policy.

Controllers 216 can provide centralized access to fabric information, application configuration, resource configuration, application-level configuration modeling for a SDN infrastructure, integration with management systems or servers, etc. Controllers 216 can form a control plane that interfaces with an application plane via northbound APIs and a data plane via southbound APIs.

As previously noted, Controllers 216 can define and manage application-level model(s) for configurations in Network Environment 200. In some cases, application or device configurations can also be managed and/or defined by other components in the network. For example, a hypervisor or virtual appliance, such as a VM or container, can run a server or management tool to manage software and services in Network Environment 200, including configurations and settings for virtual appliances.

As illustrated above, Network Environment 200 can include one or more different types of SDN solutions, hosts, etc. For the sake of clarity and explanation purposes, various examples in the disclosure will be described with reference to an ACI framework, and Controllers 216 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 206 (e.g., physical or logical), Hypervisors 208, VMs 210, containers (e.g., Applications 212), etc., and can run or include any type of server or application solution. Non-limiting examples of "hosts" can include virtual switches or routers, such as distributed virtual switches (DVS), AVE nodes, vector packet processing (VPP) switches; VCENTER and NSX MANAGERS; bare metal physical hosts; HYPER-V hosts; VMs; DOCKER Containers; etc.

Figure 2B:
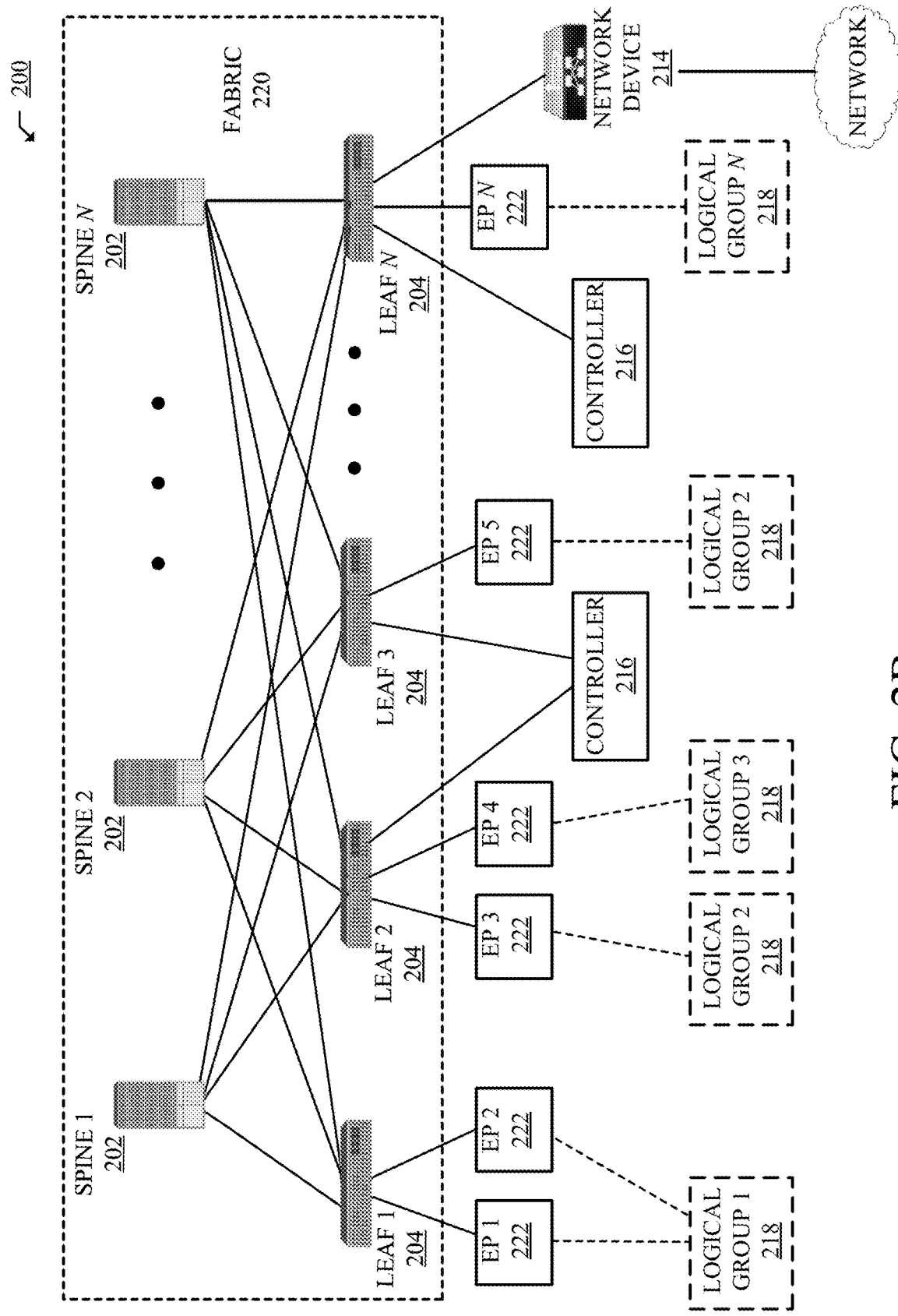
FIG. 2B illustrates another example of a network environment.

FIG. 2B illustrates another example of Network Environment 200. In this example, Network Environment 200 includes Endpoints 222 connected to Leafs 204 in Fabric 220. Endpoints 222 can be physical and/or logical or virtual entities, such as servers, clients, VMs, hypervisors, software containers, applications, resources, network devices, workloads, etc. For example, an Endpoint 222 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 222 can be associated with respective Logical Groups 218. Logical Groups 218 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 218 are EPGs in an ACI environment and/or other logical groups (e.g., SGs) in another SDN environment.

Traffic to and/or from Endpoints 222 can be classified, processed, managed, etc., based Logical Groups 218. For example, Logical Groups 218 can be used to classify traffic to or from Endpoints 222, apply policies to traffic to or from Endpoints 222, define relationships between Endpoints 222, define roles of Endpoints 222 (e.g., whether an endpoint consumes or provides a service, etc.), apply rules to traffic to or from Endpoints 222, apply filters or access control lists (ACLs) to traffic to or from Endpoints 222, define communication paths for traffic to or from Endpoints 222, enforce requirements associated with Endpoints 222, implement security and other configurations associated with Endpoints 222, etc.

In an ACI environment, Logical Groups 218 can be EPGs used to define contracts in the ACI. Contracts can include rules specifying what and how communications between EPGs take place. For example, a contract can define what provides a service, what consumes a service, and what policy objects are related to that consumption relationship.

A contract can include a policy that defines the communication path and all related elements of a communication or relationship between EPs or EPGs. For example, a Web EPG can provide a service that a Client EPG consumes, and that consumption can be subject to a filter (ACL) and a service graph that includes one or more services, such as firewall inspection services and server load balancing.

FIG. 3 illustrates a schematic diagram of an example virtual machine (VM) deployment 310. In this example, the host 302 can include one or more VMs 316. The VMs 316 can be configured to run workloads like VNFs based on hardware resources 312 on the host 302. The VMs 316 can run on guest operating systems 314 on a virtual operating platform provided by a hypervisor 318. Each VM can run a respective guest operating system which can be the same or different as other guest operating systems associated with other VMs on the host 302. Moreover, each VM can have one or more network addresses, such as an internet protocol (IP) address. The VMs 316 can communicate with hypervisors 318 and/or any remote devices or networks using the one or more network addresses.

Hypervisors 318 can be a layer of software, firmware, and/or hardware that creates and runs VMs 316. For example, the hypervisors 318 can be virtual machine managers (VMM) for hosting and managing the VMs 316. The guest operating systems running on VMs 316 can share virtualized hardware resources created by the hypervisors 318. The virtualized hardware resources can provide the illusion of separate hardware components. Moreover, the virtualized hardware resources can perform as physical hardware components (e.g., memory, storage, processor, network interface, etc.), and can be driven by the hardware resources 312 on the host 302. Hypervisors 318 can have one or more network addresses, such as an internet protocol (IP) address, to communicate with other devices, components, or networks. For example, the hypervisors 318 can have a dedicated IP address which they can use to communicate with VMs 316 and/or any remote devices or networks.

Hardware resources 312 can provide the underlying physical hardware driving operations and functionalities provided by the host 302, hypervisors 318, and VMs 316. Hardware resources 312 can include, for example, one or more memory resources, one or more storage resources, one or more communication interfaces, one or more processors, one or more circuit boards, one or more extension cards, one or more power supplies, one or more antennas, one or more peripheral components, etc.

The host 302 can also include one or more host operating systems (not shown). The number of host operating system can vary by configuration. For example, some configurations can include a dual boot configuration that allows the host 302 to boot into one of multiple host operating systems. In other configurations, the host 302 may run a single host operating system. Host operating systems can run on hardware resources 312. In some cases, a hypervisor 318 can run on, or utilize, a host operating system on the host 302.

The host 302 can also have one or more network addresses, such as an internet protocol (IP) address, to communicate with other devices, components, or networks. For example, the host 302 can have an IP address assigned to a communications interface from hardware resources 312, which it can use to communicate with VMs 316, hypervisor 318, switches, and/or any remote devices or networks.

In some examples, the host 302 can run a distributed function router. For example, VMs 316 on host 302 can host and execute one or more functionalities of the distributed function router. In some cases, host 302 can also host multiple distributed function routers via VMs 316. For example, VM 1 can host and run a first distributed function router and VM 2 can host and run a second distributed function router. The first and second distributed function routers can be different function routers or may be instances of a same function router which can be configured for load balancing, failover, auto-scaling, etc.

As discussed previously, users typically expect a specific throughput for a virtualized service chain in a virtualized network environment. Specifically, users expect that the service chain is configured correctly on the hypervisor platform and that a specific throughput is achievable through the individual VNFs, and the corresponding service chain as a whole. Typically, an infrastructure provider/service provider for the service chain is responsible for assuring an expected throughput for the chain. However, it is currently difficult for service providers to diagnose and resolve issues in service chains due to a lack of visibility in virtual networks. In particular, as multiple VNFs are used in a virtual service chain and as a result of poor visibility in virtual networks, it is difficult for service providers to identify which link or VNF is behaving as an anomaly in the service chain, e.g. as part of providing throughput assurance for the service chain to a customer.

The present includes systems, methods, and computer-readable media for solving these problems/discrepancies. Specifically, the present technology involves systems, methods, and computer-readable media for providing throughput assurance, anomaly detection and anomaly mitigation in a virtualized network service chain. More specifically, the present technology involves systems, methods, and computer-readable media for providing throughput assurance, anomaly detection, and anomaly mitigation in a virtualized network service chain on a per-network function basis.

FIG. 4 illustrates an example virtualized network environment 400 with a network throughput assurance agent 401 in accordance with various aspects of the subject technology. The virtualized network environment 400 can be implemented according to an applicable network architecture, such as the cloud computing architecture 100 or fog computing architecture 150 shown in FIGS. 1A and 1B. Further, the virtualized network environment 400 can be implemented in an applicable network environment, such as the example network environment 200 shown in FIGS. 2A and 2B.

The virtualized network environment 400 can be formed, at least in part, according to an applicable virtual machine deployment, such as the virtual machine (VM) deployment 310 shown in FIG. 3. Specifically, the virtualized network environment 400 includes a switching fabric 402. The switching fabric 402 can include physical hardware implementing one or more virtual machines and virtual functions. Specifically, the switching fabric 402 can function as a host and support a hypervisor 404 running on top of the switching fabric 402. The hypervisor 404 and the switching fabric 402 may be connected using network interface cards (not shown). For example, the hypervisor 404 can be connected to the switching fabric 402 using physical network interface cards (pNICs).

The hypervisor 404 functions according to an applicable layer for providing a virtual operating platform upon which one or more VNFs can run, such as the hypervisor 318 shown in FIG. 3. Specifically, the hypervisor 404 can function to create a virtual operating platform supporting a first VNF 406-1, a second VNF 406-2, and a third VNF 406-3 (collectively referred to as "VNFs 406"). While only three VNFs 406 are shown in FIG. 4, the virtualized network environment 400 can include more VNFs or less VNFs.

The VNFs 406 can form all or part of a virtual service chain. Specifically, the VNFs 406 can be stitched together, e.g. through the hypervisor 404, to form, at least part of, a virtual service chain of VNFs. A virtual service chain, as used herein, is a grouping of VNFs that are stitched together such that the VNFs apply operations to network traffic passing through the virtual service chain based on the arrangement of, e.g. in the order of, the VNFs in the virtual service chain. For example, traffic entering the virtual service chain at point 408, as ingress traffic for the virtual service chain, can be directed to the first VNF 406-1 at point 412 as ingress traffic to the first VNF 406-1. In turn, the first VNF 406-1 can perform one or more operations on the traffic. As follows, the traffic can pass out of the first VNF 406-1 at point 414 as egress traffic to the first VNF 406-1 after the first VNF 406-1 performs one or more operations on the traffic.

As the first VNF 406-1 is adjacent to the second VNF 406-2 in the virtual service chain, the egress traffic of the first VNF 406-1 that exits the first VNF 406-1 at point 414 can serve as ingress traffic to the second VNF 406-2. Specifically, the traffic can enter the second VNF 406-2 at point 416 as ingress traffic. In turn, the second VNF 406-2 can perform one or more operations on the traffic. As follows, the traffic can pass out of the second VNF 406-2 at point 418 as egress traffic to the second VNF 406-2 after the second VNF 406-2 performs one or more operations on the traffic. Similarly, the traffic can pass into the third VNF 406-3 at point 420 as ingress traffic to the third VNF 406-3 and pass out of the third VNF 406-3 at point 422 as egress traffic to the third VNF 406-3. As the third VNF 406-3 is the last VNF in the virtual service chain, the traffic exiting the third VNF 406-3 is the egress traffic for the virtual service chain and exits the virtual service chain at point 410.

The VNFs 406 can be stitched together through the hypervisor 404 to form the virtual service chain. Specifically, traffic passing between the VNFs 406 can pass through the hypervisor 404. For example, traffic passing out of the first VNF 406-1 at point 414 can pass into the hypervisor 404 and then into the second VNF 406-2 at point 416. Accordingly, adjacent VNFs in the virtual service chain can be linked together/stitched together through one or more link points formed in the hypervisor 404. More specifically, traffic can directly pass between adjacent VNFs through the one or more link points in the hypervisor 404 that link the adjacent VNFs to each other. By stitching together the VNFs 406 through the hypervisor 404 to form the virtual service chain, the functionality of the VNFs 406 may be combined, e.g. in a building block-style fashion, to provide various networking communication services.

Adjacent VNFs in a service chain, as used herein, include VNFs that are logically next to each other in the service chain, e.g. from a traffic processing perspective, in the order in which the VNFs operate on data passing through the service chain. For example, in the environment 400 show in FIG. 4, the first and second VNFs 406-1 and 406-2 are adjacent to each other. Further, the second VNF 406-2 and the third VNF 406-3 are adjacent to each other. A VNF can have only one adjacent VNF based on the position of the VNF in a virtual service chain. For example, the first VNF 406-1 has only one adjacent VNF, the second VNF 406-2, as the first VNF 406-1 is the first VNF in the virtual service chain. Similarly, the third VNF 406-3 has only one adjacent VNF, the second VNF 406-2, as the third VNF 406-3 is the last VNF in the virtual service chain. Further, a VNF can have a plurality of adjacent VNFs based on the position of the VNF in the virtual service chain. For example, the second VNF 406-2 has two adjacent VNFs, the first VNF 406-1 and the third VNF 406-3.

The virtual service chain in the example environment 400 shown in FIG. 4 can be formed between a consumer and a provider of network services. For example, the virtual service chain can be formed between a client and a cloud-based service provider. Further, while the traffic shown in FIG. 4 is shown as unidirectional, e.g. from point 408 to 410, the virtual service chain can also perform operations on traffic passing in the opposite direction, e.g. from point 410 to 408. Accordingly, the techniques for providing assurance that are discussed herein, can be applied to bidirectional traffic passing through the virtual service chain. For example, the technique described herein can be applied to traffic passing from a consumer to a provider through a virtual service chain and traffic passing from the provider to the consumer through the virtual service chain.

The provider of the VNFs 406 can be different from a provider of the switching fabric 402. For example, the VNFs 406 can be provided and maintained by a network service provider that is different from a provider of the actual infrastructure/hardware, e.g. switching fabric 402, over which the VNFs 406 are run through one or more VMs.

The throughput assurance agent 401 can provide assurance for the virtual service chain. Specifically, the throughput assurance agent 401 can provide throughput assurance for the virtual service chain. Throughput assurance for a virtual service chain, as used herein, can include applicable information related to network assurance and throughput in the virtual service chain. For example, throughput assurance can include an information related to a virtual service chain operation at or beneath an expected throughput for the virtual service chain, information related to a VNF behaving as an anomaly in the virtual service chain, and other applicable information related to VNFs operating, e.g. together, in the virtual service chain. For example, throughput assurance can include an indication of throughput correlated across VNFs in a service chain. In another example, throughput assurance can include which link, e.g. VNF, in a service chain dropped traffic and a location of the link in the service chain. A VNF behaving as an anomaly can include a VNF behaving differently from an expected behavior of the VNF. For example, a VNF behaving as an anomaly can include that an actual throughput at the VNF has dropped below an expected throughput at the VNF. In another example, a VNF behaving as an anomaly can include a VNF that drops traffic.

In the example environment 400 shown in FIG. 4, the throughput assurance agent 401 is shown connected to the hypervisor 404. In being connected to the hypervisor 404, the throughput assurance agent 401 can be implemented, at least in part, in the hypervisor 404. Specifically, the throughput assurance agent 401 can include an inline statistics agent that is implemented in the hypervisor 404.

The inline statistics agent functions to generate inline statistics for the virtual service chain. Specifically, the inline statistics agent can monitor traffic passing through the virtual service chain to generate inline statistics for the virtual service chain. More specifically, when the inline statistics agent is implemented in the hypervisor 404 the inline statistics agent can monitor traffic passing to and from the VNFs 406 through the hypervisor layer to generate inline statistics for the virtual service chain. Inline statistics can include applicable information related to the operation of the VNFs 406 in the virtual service chain. For example, inline statistics can include an actual throughput of traffic passing into and out of the virtual service chain.

The inline statistics agent can generate inline statistics on a per-VNF basis. Specifically, as the inline statistics agent can generate inline statistics by monitoring traffic through the hypervisor 404, the inline statistics agent can generate inline statistics for each of the VNFs 406 on a per-VNF basis. More specifically, the inline statistics agent can analyze data passing into, out of, and/or between the VNFs 406 through the hypervisor 404 to generate inline statistics for each of the VNFs 406 on a per-VNF basis. For example, the inline statistics agent can generate inline statistics for the second VNF 406-2 that includes ingress traffic throughput at the second VNF 406-2, corresponding to point 416 in the traffic flow. Further in the example, the inline statistics agent can generate inline statistics for the second VNF 406-2 that includes egress traffic throughput at the second VNF 406-2, corresponding to point 418 in the traffic flow. In another example, the inline statistics agent can generate inline statistics for the first VNF 406-1 that includes an ingress traffic throughput for the first VNF 406-1, which is the ingress traffic throughput for the entire virtual service chain as a whole. In yet another example, the inline statistics agent can generate inline statistics for the third VNF 406-3 that includes an egress traffic throughput for the third VNF 406-3, which is the egress traffic throughput for the entire virtual service chain as a whole. Ingress and egress traffic throughput at each of the VNFs 406 can be included as part of an actual throughput for the virtual service chain.

In generating inline statistics on a per-VNF basis, the inline statistics agent can generate inline statistics based on ingress traffic throughput and egress traffic throughput at each of the VNFs 406. Specifically, the inline statistics agent can compare an ingress traffic throughput at each of the VNFs 406 with an output traffic throughput at each of the VNFs 406 to generate corresponding inline statistics for each of the VNFs 406. For example, if the throughput between ingress and egress traffic passing through the first VNF 406-1 is different, then the inline statistics agent can generate inline statistics indicating that traffic is being dropped at the first VNF 406-1.

The inline statistics agent can generate inline statistics for the virtual service chain based on user/administrator input. For example, a provider of the VNFs can provide input which can be used to generate the inline statistics for the virtual service chain. Specifically, the statistics agent generate inline statistics from a user-input graph indicating the VNFs 406 and the corresponding virtual links, e.g. formed at point 412, formed between points 414 and 416, formed between points 418 and 420, and formed at point 422 of the corresponding traffic flow of the service chain. Further, the inline statistics agent can generate inline statistics from a configuration file describing the topological configuration of the VNFs 406 within the virtual service chain.

Further, the inline statistics agent can generate the inline statistics based on an expected throughput of the virtual service chain and/or an expected throughput of one or more of the VNFs 406. Specifically, the inline statistics agent can generate inline statistics based on an expected ingress traffic throughput of the virtual service chain and/or an expected ingress traffic throughput of one or more of the VNFs 406. Further, the inline statistics agent can generate inline statistics based on an expected egress traffic throughput of the virtual service chain and/or an expected egress traffic throughput of one or more of the VNFs 406. The inline statistics agent can identify expected throughput, e.g. egress and ingress traffic throughput, using an applicable technique. Specifically, the inline statistics agent can identify expected throughput based on applicable information, e.g. as part of an input graph or a topological configuration file received from a user/administrator.

The inline statistics agent can collect the statistics periodically or otherwise at set times. In one example, the inline statistics agent can use the most recently collected statistical data point as a reference point in gathering inline statistics. In another example, the inline statistics agent can use a moving average of a set of the most recently collected statistical data points to gather inline statistics.

The throughput assurance agent 401 can provide throughput assurance for the virtual service chain based on the inline statistics generated by the inline statistics agent. In particular, the throughput assurance agent 401 can provide throughput assurance for the service chain for network traffic from a consumer to a network service provider. Additionally, the throughput assurance agent 401 can provide throughput assurance for the service chain for traffic from the service provider to the consumer. Further, the throughput assurance agent 401 may provide throughput assurance for the service chain for bidirectional traffic between the service provider and the consumer.

In providing throughput assurance, the throughput assurance agent 401 can provide end-to-end throughput assurance for the virtual service chain. Specifically, the throughput assurance agent 401 can compare an entering throughput of the virtual service chain to an exit throughput off the virtual service chain to provide end-to-end throughput assurance. More specifically, the throughput assurance agent 401 can provide end-to-end throughput assurance by comparing the throughput at point 408 to the first VNF 406-1 and the throughput at point 410 out of the third VNF 406-3. If the throughput at input point 408 equals or is within a threshold range of the throughput at output point 410, then the throughput assurance agent 401 agent can report that there is no throughput anomaly in the service chain. The threshold range can be a user-defined threshold.

Further, the throughput assurance agent 401 can provide throughput assurance by comparing inline statistics for each of the VNFs 406 with an expected traffic throughput of the service chain. An expected throughput can include an expected throughput or a range of expected throughput that either or both a consumer desires or a provider of the VNFs 406 has assured. In comparing inline statistics for each of the VNFs 406 with an expected traffic throughput, the throughput assurance agent 401 can directly compare the egress data throughput at each of the VNFs 406, e.g. corresponding to points 414, 418, and 422, to the expected throughput of the service chain. In turn, one or more of the VNFs 406 have a throughput lower than the expected throughput or outside of a range of an expected throughput, then the statistics agent can flag the corresponding one or more VNFs 406 as an anomaly or otherwise provide applicable throughput assurance.

The throughput assurance agent 401 can provide throughput assurance for the virtual service chain by comparing the inline statistics for two or more of the VNFs 406. In particular, the throughput assurance agent 401 can provide throughput assurance for the virtual service chain by comparing inline statistics for a VNF to inline statistics of one or more adjacent VNFs. Specifically, the throughput assurance agent 401 can compare the inline statistics of the first VFR 406-1 with the inline statistics of the second VRF 406-2. Further, the throughput assurance agent 401 can compare the inline statistics of the second VRF 406-2 with the inline statistics of both the first VNF 406-1 and the third VNF 406-3. Additionally, the throughput assurance agent 401 can compare the inline statistics of the third VRF 406-3 with the inline statistics of the second VRF 406-2. Referring to FIG. 4, the throughput assurance agent 401 can verify that VNFs 406-1, 406-2, and 406-3 do not cause a drop in network throughput by checking that the throughput of the ingress and egress nodes of each of the VNFs 406 are equal or within a threshold range of each other. Specifically, the throughput assurance agent 401 can check that the throughput at ingress point 412 is equal to the throughput at egress point 414; the throughput at ingress point 416 is equal to the throughput at egress point 414 and egress point 418; and the throughput at ingress point 420 is equal to the throughput at egress point 418 and egress point 422. If one or more of the equalities do not hold, the statistics agent may report the specific VNF of the VNFs 406 involved in the inequality as the VNF causing the throughput anomaly. While reference is made in to comparing the throughput between the VNFs as being equal or not, the techniques described with respect to comparing ingress and egress throughput across the VNFs 406 can be compared based on thresholds. For example, if the throughput at egress point 414 is falls outside of a threshold when compared to the throughput at ingress point 412, then the throughput assurance agent 401 can identify the first VNG 406-1 as an anomaly. Applicable thresholds, as described herein, can be user-defined, e.g. user-defined ranges.

In various embodiments, the expected data throughput for the service chain may be higher than the actual traffic throughput at the input point 408, corresponding to the entering throughput for the virtual service chain. Specifically, the entering throughput for the service chain at the first VNF 406 can be lower than the expected throughput for the virtual service chain. In turn, the throughput assurance agent 401 can provide throughput assurance based on the entering throughput being lower than the expected throughput for the virtual service chain. Specifically, if the entering throughput is lower than the expected throughput for the virtual service chain, then the corresponding throughput, e.g. ingress and egress throughput, at each of the VNFs can be less than the expected throughput for the virtual service chain. As a result, the throughput assurance agent can refrain from flagging the VNFs 406 as anomalies even though the throughput of one or more of the VNFs 406 drops below a threshold of the expected throughput of the virtual service chain.

Conversely, the expected data throughput for the service chain may be lower than the actual traffic throughput at the input point 408, corresponding to the entering throughput for the virtual service chain. Specifically, the entering throughput for the service chain at the first VNF 406 can be higher than the expected data throughput for the virtual service chain. In turn, the throughput assurance agent 401 can provide throughput assurance based on the entering throughput being higher than the expected throughput for the virtual service chain. Specifically, if the entering throughput is higher than the expected throughput for the virtual service chain, then the corresponding throughput can ensure that the throughput at each of the VNFs 406 does not drop below the expected throughput or a threshold range of the expected throughput of the virtual service chain.

Further, if the entering throughput is lower or higher than the expected throughput for the virtual service chain, then the throughput assurance agent 401 can be configured to automatically analyze inline statistics for each of the VNFs 406 and corresponding points 412, 414, 416, 418, 420, and 422. Specifically, the throughput assurance agent 401 can compare ingress and egress traffic throughput at each of the VNFs 406 on a per-VNF basis to identify any potential drops in throughput across the VNFs 406 in response to the entering throughput being lower or higher than the expected throughput. In turn, the throughput assurance agent 401 can mark a VNF as an anomaly if a drop in throughput is observed across the VNF. For example, if the entering throughput is higher than the expected throughput, then the throughput assurance agent 401 can analyze inline statistics for each of the VNFs 406 to ensure that the throughput across each of the VNFs 406 does not drop below the expected throughput or a threshold range of the expected throughput of the virtual service chain.

In providing throughput assurance based on identified drops in traffic throughput in the service chain, the throughput assurance agent 401 can determine a point of traffic drop in the service chain. Specifically, the throughput assurance agent 401 can collect the statistics of the virtual links in the service chain. The virtual links may include the link between the consumer's incoming traffic and the first VNF of the service chain, the link between consecutive VNFs, e.g. corresponding to adjacent VNFs, in the service chain, and/or the link between the last VNF of the service chain and the outgoing traffic to the service provider. Specifically, the throughput assurance agent 401 can collect the ingress and egress traffic statistics of each VNF, as included as part of the generated inline statistics, to determine the point of traffic anomaly.

An identified traffic anomaly point can then be used to deduce the exact cause of failure. Example causes of failure in a service chain include sub-optimal placement algorithms, network I/O bottle necks, CPU profiling, user misconfigurations, and memory trashing. Specifically, if the throughput assurance agent 401 detects one or more anomalies, e.g. a drop in traffic across a VNF, in the service chain, then the throughput assurance agent 401 can feed the anomaly information to a deduction agent, e.g. as included as part of the throughput assurance agent 401. The deduction agent can then run deductions based on the environment 400. For example, the deduction agent can make deductions based on the VNF placement, VNF licensing, CPU pinning, or NUMA node balancing, e.g. as indicated by user-provided information. Deduction made by the deduction agent can include applicable deductions related to providing throughput assurance. For example, deductions can include that a VNF is improperly configured in the environment 400.

In turn, the deduction agent can deduce possible causes of the network throughput anomaly to the user. For example, possible can include CPU usage, firewall, and traffic being dropped in the service chain.

In some examples, the deduction output from the deduction agent would be used to alert the user. The user alert may include the deduction, as well as specific throughput information for each of the nodes in the service chain as collected by the statistic agent.

In some examples, the output from the deduction agent can be used to trigger an auto-correct feature to mitigate anomalies in the service chain. The auto-correct feature may be implemented as policies where each type of anomaly triggers a specific mitigation action to be taken on the service chain.

FIG. 5 illustrates a computing system architecture 500 wherein the components of the system are in electrical communication with each other using a connection 505, such as a bus. Exemplary system 500 includes a processing unit (CPU or processor) 510 and a system connection 505 that couples various system components including the system memory 515, such as read only memory (ROM) 520 and random access memory (RAM) 525, to the processor 510. The system 500 can include a cache 512 of high-speed memory connected directly with, in close proximity to, or integrated as part of the processor 510. The system 500 can copy data from the memory 515 and/or the storage device 530 to the cache 512 for quick access by the processor 510. In this way, the cache 512 can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware or software service, such as service 1 532, service 2 534, and service 3 536 stored in storage device 530, configured to control the processor 510 as well as a special-purpose processor where software instructions are incorporated into the actual processor design. The processor 510 may be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include services 532, 534, 536 for controlling the processor 510. Other hardware or software modules are contemplated. The storage device 530 can be connected to the system connection 505. In one aspect, a hardware module that performs a particular function can include the software component stored in a computer-readable medium in connection with the necessary hardware components, such as the processor 510, connection 505, output device 535, and so forth, to carry out the function.

FIG. 6 illustrates an example network device 600 suitable for performing switching, routing, load balancing, and other networking operations. Network device 600 includes a central processing unit (CPU) 604, interfaces 602, and a bus 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 604 to efficiently perform routing computations, network diagnostics, security functions, etc.

Although the system shown in FIG. 6 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the bus 610, to exchange data and signals and coordinate various types of operations by the network device 600, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
    monitoring a virtual service chain formed by a plurality of stitched virtualized network functions running on a plurality of virtual nodes;
    generating, by an inline statics agent, inline statistics of the operation of the virtual service chain;
    identifying an actual throughput of the virtual service chain from the inline statistics; and
    providing throughput assurance for the virtual service chain by comparing the actual throughput of the virtual service chain with an expected throughput of the virtual service chain.

2. The method of claim 1, wherein the inline statics agent is implemented in a hypervisor layer under the plurality of virtual nodes.

3. The method of claim 2, wherein the virtualized network functions are stitched together, at least in part, through the hypervisor layer and data passing between the virtualized network functions is monitored by the inline statistics agent in the hypervisor layer to generate the inline statistics for the virtual service chain.

4. The method of claim 1, further comprising analyzing data passing between the virtualized network functions on a per-virtual node basis of the plurality of virtual nodes to generate inline statistics for each of the virtualized network functions in the virtual service chain as part of generating the inline statistics for the virtual service chain.

5. The method of claim 4, wherein the inline statistics for each of the virtualized network functions is generated by comparing ingress data throughput at each of the virtualized network functions to corresponding egress data throughput at each of the virtualized network functions.

6. The method of claim 4, further comprising:
    comparing the inline statistics for each of the virtualized network functions with the inline statistics of one or more adjacent virtualized network functions in the virtual service chain; and
    providing the throughput assurance for the virtual service chain based on comparisons of the inline statistics of each of the virtualized functions with the inline statistics of the one or more adjacent virtualized network functions in the virtual service chain.

7. The method of claim 6, wherein adjacent virtualized network functions share a virtual link point in the virtual service chain to allow the data to pass directly between the adjacent virtualized network functions as the data passes through the virtual service chain.

8. The method of claim 4, further comprising:
    comparing corresponding egress data throughput at each of the virtualized network functions, as included as part of the inline statistics for each of the virtualized network functions, with the expected throughput of the virtual service chain; and
    providing the throughput assurance for the virtual service chain based on comparisons of the corresponding egress data throughput at each of the virtualized network functions with the expected throughput of the virtual service chain.

9. The method of claim 8, further comprising:
    determining that a virtualized network function in the virtual service chain is behaving as an anomaly in the virtual service chain based on a comparison with an egress data throughput at the virtualized network function with the expected throughput of the virtual service chain; and
    reporting the virtualized network function as the anomaly as part of providing the throughput assurance for the virtual service chain.

10. The method of claim 9, wherein the virtualized network function is identified as the anomaly in response to the egress data throughput at the virtualized network function being below the expected throughput of the virtual service chain.

11. The method of claim 4, further comprising:
comparing entering throughput of a first virtualized network function of the virtual service chain to the expected throughput; and
providing the throughput assurance for the virtual service chain based on a comparison of the entering throughput to the expected throughput.

12. The method of claim 11, further comprising analyzing the data passing between the virtualized network function on the per-virtual node basis if the entering throughput is less than the expected throughput.

13. The method of claim 1, wherein the virtual service chain is formed between a consumer and a provider and the throughput assurance for the virtual service chain is provided in either or both a direction from the consumer to the provider and from the provider to the consumer.

14. The method of claim 1, wherein an infrastructure provider of the plurality of virtual nodes is different from a network service provider of the virtual service chain.

15. A system comprising:
one or more processors; and
at least one computer-readable storage medium having stored therein instructions which, when executed by the one or more processors, cause the one or more processors to perform operations comprising:
monitoring a virtual service chain formed by a plurality of stitched virtualized network functions running on a plurality of virtual nodes;
generating, by an inline statics agent, inline statistics of the operation of the virtual service chain, wherein the inline statistics is implemented in a hypervisor layer under the plurality of virtual nodes;
identifying an actual throughput of the virtual service chain from the inline statistics; and
providing throughput assurance for the virtual service chain by comparing the actual throughput of the virtual service chain with an expected throughput of the virtual service chain.

16. The system of claim 15, wherein the instructions which, when executed by the one or more processors, further cause the one or more processors to perform operations comprising analyzing data passing between the virtualized network functions on a per-virtual node basis of the plurality of virtual nodes to generate inline statistics for each of the virtualized network functions in the virtual service chain as part of generating the inline statistics for the virtual service chain.

17. The system of claim 16, wherein the instructions which, when executed by the one or more processors, further cause the one or more processors to perform operations comprising:
comparing the inline statistics for each of the virtualized network functions with the inline statistics of one or more adjacent virtualized network functions in the virtual service chain; and
providing the throughput assurance for the virtual service chain based on comparisons of the inline statistics of each of the virtualized functions with the inline statistics of the one or more adjacent virtualized network functions in the virtual service chain.

18. The system of claim 16, wherein the instructions which, when executed by the one or more processors, further cause the one or more processors to perform operations comprising:
comparing corresponding egress data throughput at each of the virtualized network functions, as included as part of the inline statistics for each of the virtualized network functions, with the expected throughput of the virtual service chain; and
providing the throughput assurance for the virtual service chain based on comparisons of the corresponding egress data throughput at each of the virtualized network functions with the expected throughput of the virtual service chain.

19. The system of claim 18, wherein the instructions which, when executed by the one or more processors, further cause the one or more processors to perform operations comprising:
determining that a virtualized network function in the virtual service chain is behaving as an anomaly in the virtual service chain based on a comparison with an egress data throughput at the virtualized network function with the expected throughput of the virtual service chain; and
reporting the virtualized network function as the anomaly as part of providing the throughput assurance for the virtual service chain.

20. A non-transitory computer-readable storage medium having stored therein instructions which, when executed by a processor, cause the processor to perform operations comprising:
monitoring a virtual service chain formed by a plurality of stitched virtualized network functions running on a plurality of virtual nodes;
generating, by an inline statics agent, inline statistics of the operation of the virtual service chain, wherein the virtualized network functions are stitched together, at least in part, through a hypervisor layer and the data passing between the virtualized network functions is monitored by the inline statistics agent in the hypervisor layer to generate the inline statistics for the virtual service chain;
identifying an actual throughput of the virtual service chain from the inline statistics; and
providing throughput assurance for the virtual service chain by comparing the actual throughput of the virtual service chain with an expected throughput of the virtual service chain.

* * * * *